United States Patent [19]

Schwab

[11] 4,166,195

[45] Aug. 28, 1979

[54] DUCT APPARATUS FOR DISTRIBUTION OF ISOLATED POWER AND EQUIPOTENTIAL GROUND

[75] Inventor: Ardath M. Schwab, Irvine, Calif.

[73] Assignee: Isotrol Systems, Los Alamitos, Calif.

[21] Appl. No.: 818,113

[22] Filed: Jul. 22, 1977

[51] Int. Cl.² .......................... H02G 5/06; H02G 3/04
[52] U.S. Cl. .................................... 174/95; 174/99 B; 174/101; 339/22 B; 361/378; 361/426
[58] Field of Search ................... 174/48, 49, 51, 68 B, 174/68 C, 70 B, 70 C, 71 B, 72 B, 72 C, 95, 97, 99 B, 101; 339/14 R, 22 R, 22 B, 23, 24; 361/355, 361, 378, 426; 52/220, 221; 138/108, 111, 115–117, 157

[56] References Cited

U.S. PATENT DOCUMENTS

| 1,905,121 | 4/1933 | Adam | 361/426 |
|---|---|---|---|
| 2,643,363 | 6/1953 | Robertson et al. | 361/361 X |
| 3,267,336 | 8/1966 | Kussy et al. | 361/361 |
| 3,708,607 | 1/1973 | Brode et al. | 174/48 |

FOREIGN PATENT DOCUMENTS

| 1257927 | 1/1968 | Fed. Rep. of Germany | 339/23 |
|---|---|---|---|
| 2103110 | 8/1972 | Fed. Rep. of Germany | 174/97 |
| 2309848 | 9/1974 | Fed. Rep. of Germany | 174/48 |
| 2516404 | 10/1976 | Fed. Rep. of Germany | 174/68 C |
| 1442046 | 7/1976 | United Kingdom | 174/48 |

Primary Examiner—Laramie E. Askin
Attorney, Agent, or Firm—Jackson, Jones & Price

[57] ABSTRACT

In environments utilizing highly explosive or flammable materials and in hospital operating rooms, the use of isolated power and an equipotential grounding system is essential. The distribution of isolated power and an equipotential ground on the surface areas of such enivornments is accomplished by a duct which is essentially an extruded aluminum channel that fastens to the wall with mounting screws. The channel has a main body portion and a cover plate that snap fits to the body portion. The channel is adapted to be utilized in sections, each section being readily attachable to another section. A ground bus bar is carried in the channel to which all ground leads are directly connected. In an alternate embodiment, the duct is adaptable to effectively provide two separate channels by the insertion of a partition which is held in place by holding fingers. The channels of both the single and double duct can be further subdivided into wire retaining regions by spring metal partitions that snap fit into retainers in the interior of the duct.

12 Claims, 7 Drawing Figures

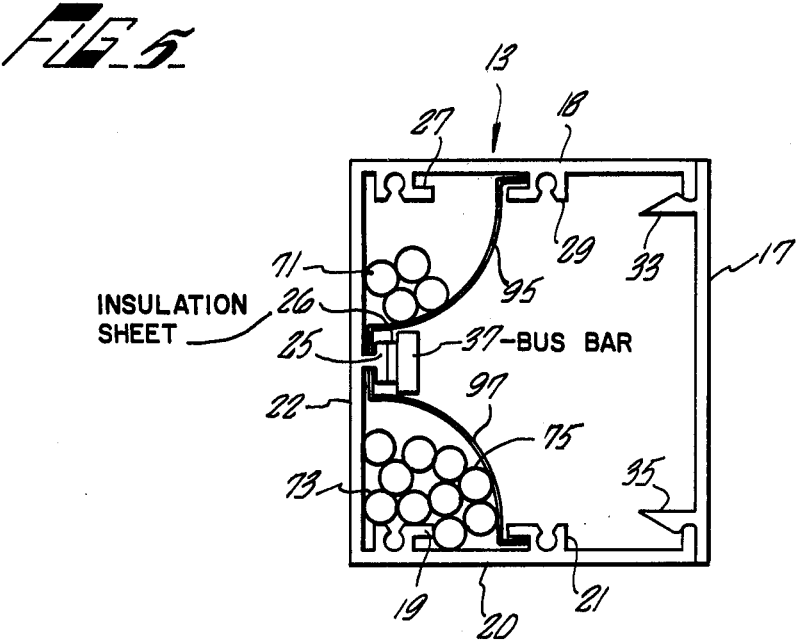
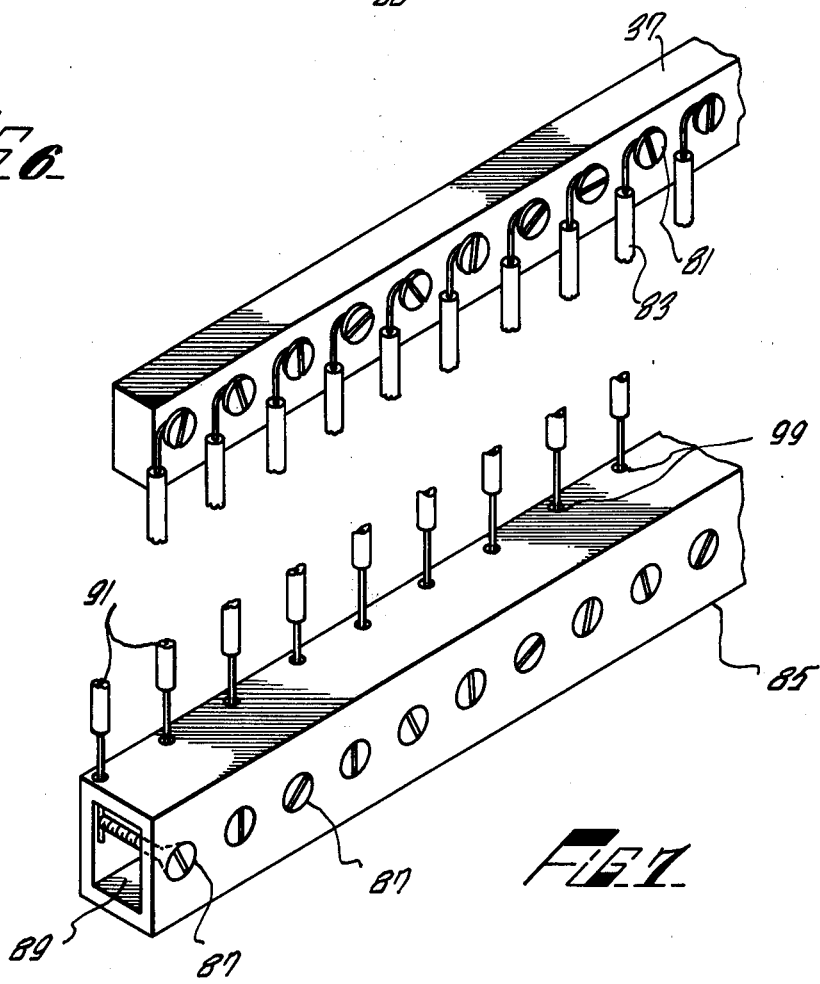

DUCT APPARATUS FOR DISTRIBUTION OF ISOLATED POWER AND EQUIPOTENTIAL GROUND

BACKGROUND OF THE INVENTION

The present invention relates generally to improvements in electrical distribution raceways and more particularly pertains to new and improved duct apparatus for distributing isolated power and equipotential ground on the surface of walls and ceilings of environments being reworked for isolated power and equipotential ground systems. Isolated power and equipotential ground systems are required, for example, in hospital environments utilizing inhalation anesthetics.

The problems inherent in utilizing electric power in environments containing explosive or flammable gasses is self evident. The problem is most acute in hospital environments wherein both flammable and non-flammable inhalation anesthetics are utilized along with electrically powered equipment. In order to prevent any possibility of a static spark discharge, most operating rooms utilize a controlled 50% humidity and a conductive floor. All personnel working in the area wear conductive shoes. These measures are taken to keep the personnel and equipment in the operating room relatively electrically neutral and prevent a static build up that could result in a point discharge.

Aside from the danger of explosion when flammable anesthetics are utilized, the danger to the patient has served as considerable impetus to prevent stray currents. For example, it only takes on the average of 0.1 to 0.3 amp at 60 cycles applied for one second to cause ventricular fibrillation of the heart when applied externally to the body. It only takes on the average of 10-100 microamps of current at 60 cycles applied for one second to cause ventricular fibrillation of the heart when applied directly to the heart. The heart is exposed during open-heart surgery, for example. Such very small currents must be guarded against for the sake of the patient and the personnel serving him.

As a result of concern for the patient and these inherent dangers in the use of flammable anesthetics, power to a hospital operating room must be supplied through an isolation transformer that has ground-leakage monitoring devices mounted in its secondary. These ground-leakage monitors monitor for any abnormal leakage current flow between either of the secondary power wires and ground. If leakage current flow of a certain amount is detected, then an alarm will be activated. In essence, the ground-leakage monitor indicates equipment failure of the type in which one of the two current-carrying wires is somehow connected, or partially connected, to the frame of the electrical equipment. The National Fire Protection Association Code No. 56A, 1973, requires that all equipment and the patient in a hospital operating room be grounded to an equipotential ground system An equipotential ground system is required for the reason that small current flows in the ground wires could injure the patient, especially if he is catheterized. If all grounds in an operating room are connected together, any potential difference between the different ground wires is equalized, thereby reducing the danger of injury to the patient as a result of small current flows in the ground system.

Power and ground outlets throughout an operating environment which supply isolated power and equipotential ground points is required by the National Fire Protection Association Code No. 56A, 1973. Hitherto, it has been distributed only in the newer hospitals wherein the isolated power and equipotential ground lines were placed within the confines of the walls of the operating room. Older hospitals, prior to the present invention, were faced with the extremely high expense of distributing the isolated power and equipotential ground only in the interior of the walls of the operating room. This, in essence, meant that such walls had to be torn down and built again.

This is no longer the case. As a result of the present invention, all requirements of the National Fire Protection Association for the distribution of isolated power and equipotential ground is complied with while distributing the same on the surface of existing walls and ceilings.

OBJECTS AND SUMMARY OF THE INVENTION

An object of this invention is to provide a surface duct for electrical wires that can safely distribute power in environments sensitive to current leakage.

Another object of this invention is to provide a surface duct for electrical wires distributing isolated power and equipotential ground in surgical environments.

These objects and the general purpose of this invention are accomplished as follows. An extruded aluminum duct is provided by a main body portion and a cover plate. The cover plate snap fits to the main body portion to completely enclose the interior of the duct when in place and can be removed for service purposes. The cover plate has mounted therein the various connector receptacles desired. The duct can carry a ground bus which is fastened to an appurtenance in its interior. Each ground bus has a plurality of connection points for receiving all the ground wires from the environment in which it is located. The duct may be partitioned into two separate channels by adding an aluminum partition. The channels, in turn, may be divided into separate raceways for segregating the ground and power leads by spring metal dividers that snap fit into retainers in the interior of the duct. The exterior of the duct is anodized to provide a surface that may be maintained medically clean.

BRIEF DESCRIPTION OF THE DRAWINGS

Other objects and many of the attendant advantages of this invention will be readily ascertained as the same becomes better understood by reference to the following detailed description considered in conjunction with the accompanying drawings in which like reference numerals designate like parts throughout the figures thereof and wherein:

FIG. 5 is a side view of the duct apparatus of the present invention showing an additional feature thereof;

FIG. 6 is a perspective illustration of a ground bus used in the present invention;

FIG. 7 is a perspective illustration of an alternate embodiment of the ground bus for use with the present invention.

DESCRIPTION OF THE PREFERRED EMBODIMENT

Figure 1:
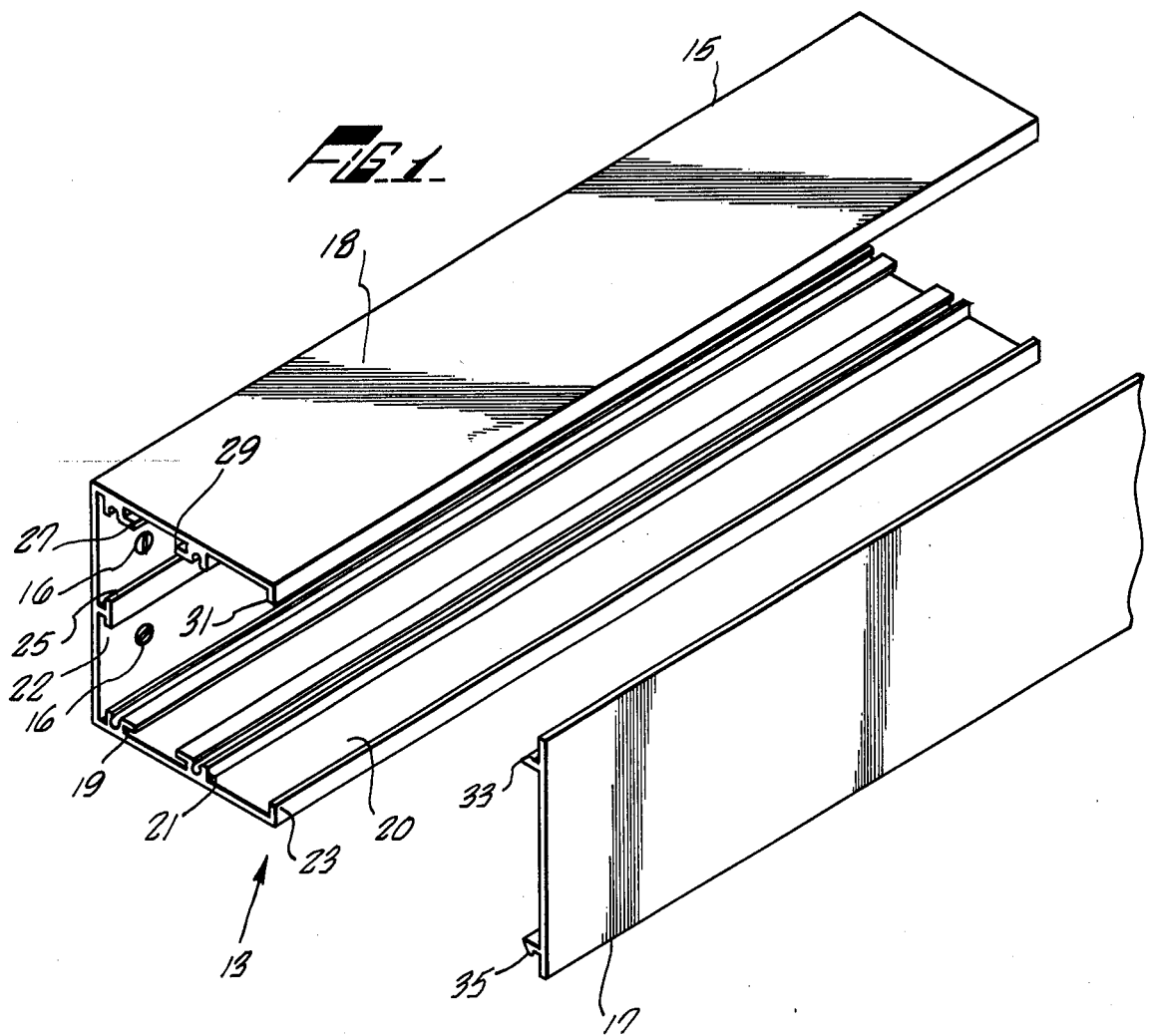
FIG. 1 is an exploded perspective of a preferred embodiment of the duct apparatus of the present invention.

Referring first to FIG. 1, a preferred embodiment of the surface duct apparatus according to the present invention is shown in an exploded perspective. The duct 13 essentially comprises two major parts, a main body portion 15 and a cover plate 17. Both parts 15 and 17 are preferably manufactured from extruded aluminum which is anodized in custom colors if preferred. The anodized aluminum structure of the duct provides a high degree of corrosion resistance which is important in a hospital environment requiring clinically clean fixtures.

The main body portion 15 is essentially rectangular and U-shaped in that the top and bottom sides 18, 20 are flat and the same width, and the back side 22 is flat and of the same or a different width than the top and bottom sides 18, 20.

The main body portion 15 of the duct 13 is held against the surface on which it is mounted by screw-type fastening devices 16 that extend through the back 22 of the main body portion into the mounting surface. The mounting device 16 such as screws pass through holes (not shown) in the back 22 of the main body portion 15.

Figure 2:
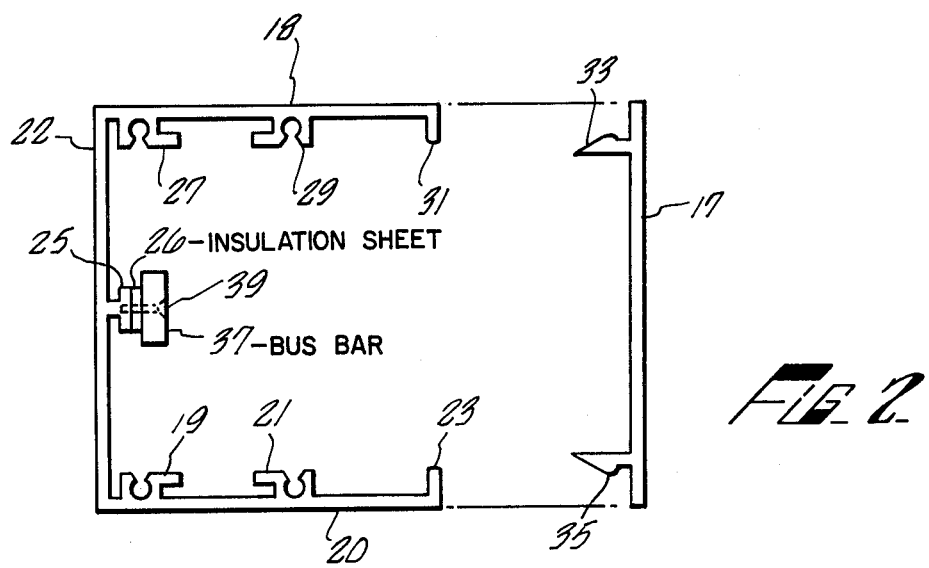
FIG. 2 is a side view of the duct apparatus of the present invention.

Referring both to FIG. 1 and FIG. 2, the interior of the main body portion 15 contains therein a bus-bar mounting boss 25 preferably located on the back side 22 of the main body portion 15 and a plurality of retainer protrusions 19, 21, 27, and 29 extruded on the sides 20 and 18, respectively, of the body portion 15. The bus-bar mounting boss 25 is preferably T-shaped as shown in FIG. 1, the top of the T extending into the interior. The open edges of the sides 18 and 20 of the body portion 15 have ridges 31 and 23, respectively, running along their length, said ridges extending towards the other side of the main body portion 15. The retainer protrusions, ridges, and bus-bar mounting boss are preferably all an integral part of the main body portion 15, such items being formed during the extrusion process for the main body portion 15.

The cover plate 17 is essentially a flat, rectangular surface similar but not identical in dimension to the back surface 22 of the main body portion 15. As an integral part of the cover plate, a pair of latching members, 33 and 35 run along the length of the cover plate at a distance from its edges so that the latching members 33, 35, respectively, latch on the ridges 31, 23 of the main body portion 15, in effect causing the cover plate 17 to snap fit and be held in position.

A copper ground bus 37 for distributing equipotential ground is fastened to the T-shaped bus-bar boss 25 by way of a screw 39 which is journaled through the bus bar and threaded into the boss 25. A sheet of insulating material 26 may be placed between the bus bar 37 and the boss 25. The preferred structure of the ground bus bar 37 will be explained hereinafter.

Figure 3:
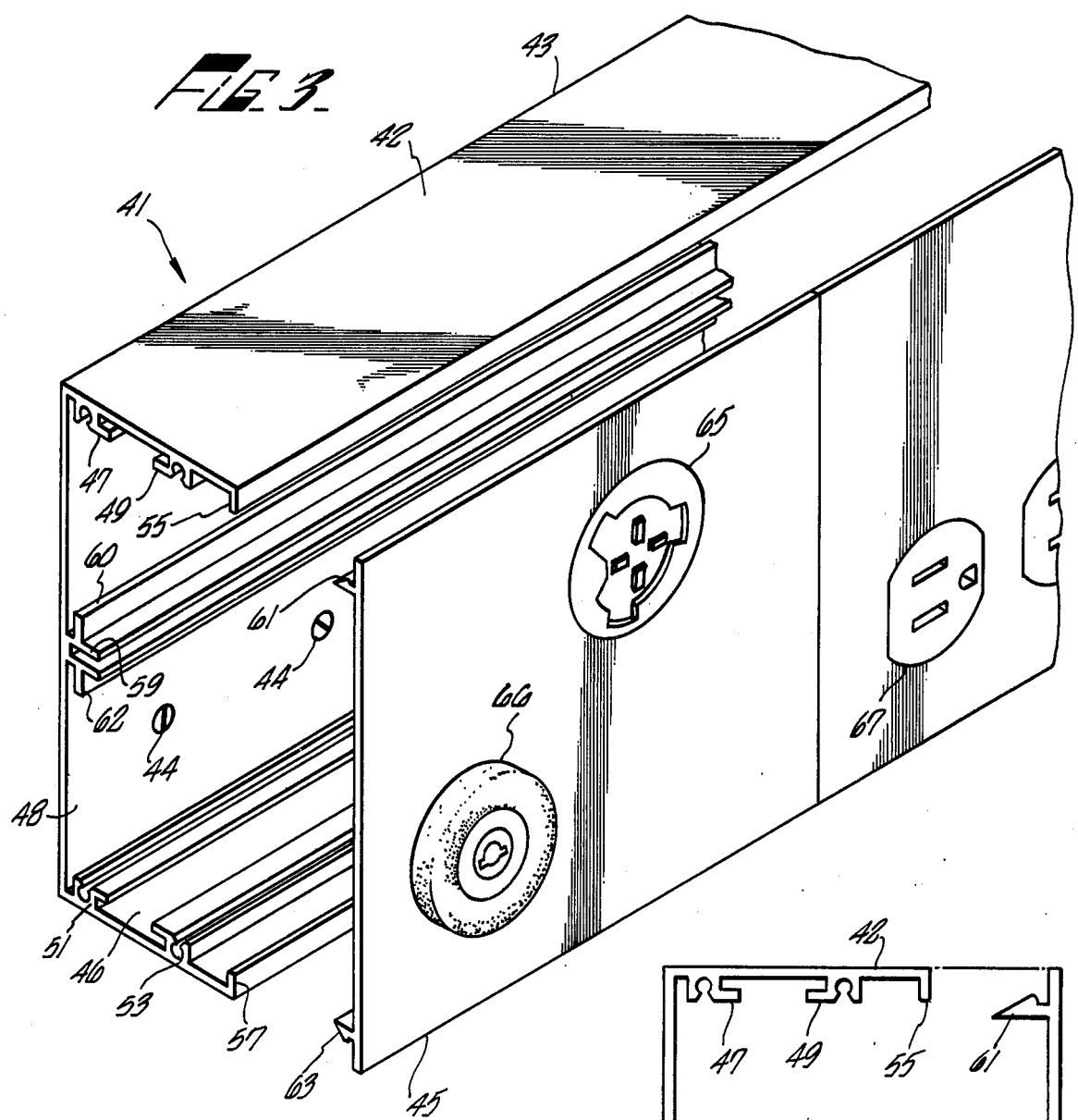
FIG. 3 is an exploded perspective of an alternate embodiment of the duct apparatus of the present invention.
Figure 4:
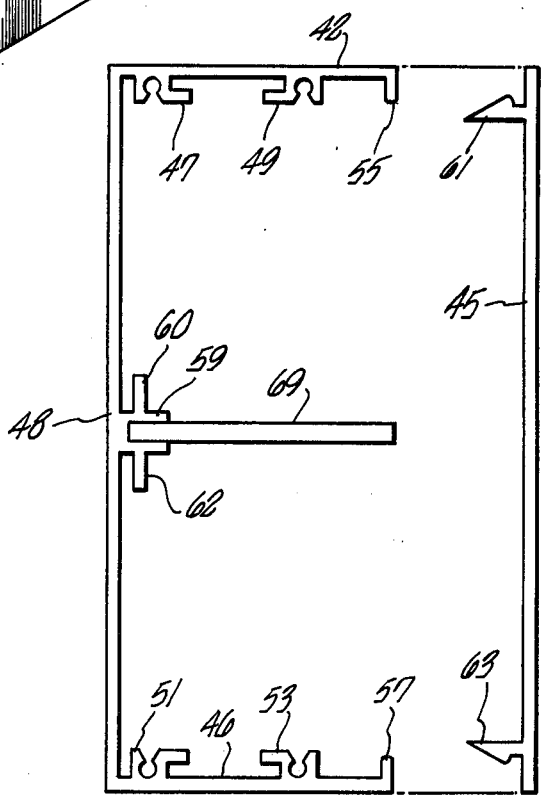
FIG. 4 is the side view of the alternate embodiment of FIG. 3.

FIGS. 3 and 4 illustrate an alternate preferred embodiment of the present invention wherein duct 41 is constructed to be capable of use as two separate ducts by the addition of a partition 69. The main body portion 43 of this double duct has a pair of sides 42, 46, respectively, and a back 48, which mounts to a mounting surface by way of screw-fastening devices 44. The back plate 48 of the main body portion 43 is much wider than the top and bottom plates 42, 46. Whether the back 48 is twice as wide is not critical. The interior of the body portion has a plurality of retainer protrusions 47, 49, 51, and 53 mounted to the top and bottom 42, 46, respectively, with a pair of ridges 55 and 57 running along the edges of the top and bottom 42, 46, respectively. Mounted on the back side 48 of the main body portion 43 is retainer protrusion 59 having a pair of fingers forming a slot therein which receives the partition 69 and holds it perpendicular to the back 48 of the main body portion 43, thereby effectively dividing the main body portion into two separate ducts. The retainer protrusions 47, 49 are in one of such ducts, and the retainer protrusions 51, 53 are in the other. A pair of bus-bar mounting surfaces 60 and 62 are formed as part of the retainer protrusion 59.

The cover plate 45 is approximately of the same width as the back plate 48 of the main body portion and snap fits to the main body portion by a pair of latching members 61, 63 that engage respective ridges 55, 57 running along the edges of the top and bottom surfaces 42, 46, respectively, of the main body portion.

For purposes of example, receptacles of various types are illustrated in FIG. 3 as being mounted on the cover plate 45. When the duct is to be used for remodeling existent surgery rooms to distribute equipotential ground and isolated power, special receptacles 66, 65 are mounted on the cover plate which comply with the National Fire Protection Association Standard No. 56A, 1973.

Receptacle 66 is a ground-cord receptacle of the twist-lock type as specifically described in the National Fire Protection Association Standard No. 56A, 337 and illustrated in FIG. 1 on page 56A-28 thereon. This receptacle, as described, is a lock-type grounding plug that receives the grounding cords attached to equipment and patients in the environment. The electrical connection is then made from the plug 66 to the equipotential grounding bus located in the duct 41.

The receptacle 65 is an isolated power receptacle as specifically described in the National Fire Protection Association Standard No. 56A, 1973, 342. It is illustrated in FIGS. 2, 3, and 4 on pages 56A-30, 56A-32, and 56A-34, respectively, of the National Fire Protection Association Standard. These receptacles, again, are lock-type receptacles that supply power to electrical equipment in the surrounding environment.

The duct 43 of the present invention also has utility outside of hospital environments and may be used in other environments where danger of sparking must be minimized due to explosive gases in the environment. Accordingly, receptacle 67 of a type other than required by the National Fire Protection Association in Standard 56A, 1973, may be utilized in these other environments.

Referring now to FIG. 5, the duct 13 of FIG. 1 is illustrated in profile with the cover plate 17 snapped thereon. The use of spring retainer clips 95 and 97 is illustrated. The retainer clips are maintained in position by retainer protrusion 29 and the bus-bar mounting boss 25, and retainer protrusion 21 and the bus-bar mounting boss 25. These retainer clips separate the conductors running through the duct 13 so as to minimize leakage of current between them. Thus, for the example, conductors 71 may be the isolated power lines and conductors 73 may be the ground wires. The spring retainer clips 95, 97 may be any desired length but preferably shorter than the length of the duct 13.

FIGS. 6 and 7 illustrate two alternate embodiments of an equipotential ground bus bar to be utilized with the duct. FIG. 6 illustrates a ground bus 37 which is essentially solid copper and has a plurality of screws 81 threaded therein, each screw being capable of receiving a ground wire 83, such as from the ground cord receptacle 66, for example, shown in FIG. 3. The ground bus 85 of FIG. 7 is essentially a hollow copper bar having an aperture 89 through its longitudinal center. A plurality of screws 87 are threaded into one side of the ground bus 85. A plurality of holes 99 are formed into another side orthogonal to the side of the bar 85 in which the screws are threaded. A plurality of ground conductors 91 may be attached to the ground bus 85 by inserting the wires through the apertures 99 and fastening them against the back side of the aperture 89 by the respective metal screws 87.

In summary, what has been described is a surface duct for electrical wires that can safely distribute power in environments sensitive to current leakage and that provides for distribution of isolated power and equipotential ground in surgery environments on the surface or walls of such environments. It should be understood, of course, that the foregoing disclosure relates only to preferred embodiments of the invention, and modifications may be made therein without departing from the spirit and scope of the invention as set forth in the appended claims.

What is claimed is:

1. A surface duct for distributing power conductors comprising:
   a main body portion being essentially U-shaped, having a pair of ridges running along the length of the open ends of said body portion, essentially perpendicular to the sides thereof, a boss in the interior of said main body portion and extending substantially along the length thereof, said boss adapted for fastening a bus-bar thereto, a plurality of retainer protrusions in the in the interior of said main body portion located to retain at least one flexible partition therein;
   a bus bar fastened to said mounting bus; and
   a cover plate removably attachable to the open side of said main body portion.

2. The duct of claim 1 wherein said bus-bar mounting boss is essentially T-shaped, said bus bar being fastened to the top portion of the "T" by screws.

3. The surface duct of claim 2 further comprising a flexible partition retained between a pair of said retainer protrusions to form a separate channel for conductors.

4. The duct of claim 1 wherein said cover plate includes a plurality of receptacles mounted and retained thereon.

5. A surface duct for distributing isolated power conductors and equipotential ground, comprising:
   a main body portion being essentially U-shaped, of extruded aluminum, having a pair of ridges running along the length of the open ends of said body portion, essentially perpendicular to the sides thereof, a mounting boss in the interior of said main body portion and extending substantially along the length thereof, said boss adapted for fastening a bus-bar to the top surface thereof, and a plurality of retainer protrusions in the interior of said main body portion located to retain at least one flexible partition;
   a bus bar mounted on said bus bar mounting boss.

6. The duct of claim 5 wherein said bus-bar mounting boss is essentially T-shaped and located at the approximate center of one side of said main body portion for the entire length thereof.

7. The duct of claim 6 wherein said boss is further adapted to retain one edge of a flexible partition, said duct further comprising a flexible partition retained between said boss and a retainer protrusion to form a separate channel for conductors within the duct.

8. A surface duct for distributing power conductors, comprising:
   a main body portion being essentially U-shaped, having a pair of ridges running along the length of the open ends of said body portion, essentially perpendicular to the sides thereof, an essentially T-shaped bus-bar mounting boss in the interior of said main body portion, a plurality of retainer protrusions in the interior of said main body portion located to retain at least one flexible partition therein;
   a bus bar fastened to the top portion of the "T" of said mounting boss by screws, and
   a cover plate removably attachable to the open side of said main body portion.

9. A surface duct for distributing isolated power conductors and equipotential ground, comprising:
   a main body portion being essentially U-shaped, of extruded aluminum, having a pair of ridges running along the length of the open ends of said body portion, essentially perpendicular to the sides thereof, a bus-bar mounting boss in the interior of said main body portion, and a plurality of retainer protrusions in the interior of said main body portion located to retain at least one flexible partition; and
   a bus bar mounted on said bus-bar mounting boss by screws, said bus bar comprising a solid bar of conductive metal having screws threaded therein for holding down conductor wire.

10. A surface duct for distributing isolated power conductors and equipotential ground, comprising:
    a main body portion being essentially U-shaped, of extruded aluminum, having a pair of ridges running along the length of the open ends of said body portion, essentially perpendicular to the sides thereof, a bus bar mounting boss in the interior of said main body portion, and a plurality of retainer protrusions in the interior of said main body portion located to retain at least one flexible partition; and
    a bus bar mounted on said bus-bar mounting boss by screws, said bus bar comprising a hollow core, conductive metal stock having screws threaded therein on one side thereof, and apertures in alignment with said screws on an orthogonal side thereof.

11. A duct for distributing isolated power conductors and equipotential ground on the surface of hospital surgery rooms, said duct comprising:
    a main body portion being essentially U-shaped, of extruded aluminum, having a pair of ridges running along the length of the open ends of said body portion, essentially perpendicular to the sides thereof, a bus bar mounting boss in the interior of said main body portion, and a plurality of retainer protrusions in the interior of said main body portion located to retain at least one flexible partition;

a cover plate of extruded aluminum, removably attachable to the open side of said main body portion; and a bus bar mounted on said bus bar mounting boss by screws, said bus bar comprising a solid bar of conductive metal having screws threaded therein for holding down conductor wire.

12. A duct for distributing isolated power conductors and equipotential ground on the surface of hospital surgery rooms, said duct comprising:

a main body portion being essentially U-shaped, of extruded aluminum, having a pair of ridges running along the length of the open ends of said body portion, essentially perpendicular to the sides thereof, a bus bar mounting boss in the interior of said main body portion, and a plurality of retainer protrusions in the interior of said main body portion located to retain at least one flexible partition;

a cover plate of extruded aluminum, removably attachable to the open side of said main body portion; and a bus bar mounted on said bus-bar mounting boss; said bus bar comprising a hollow core, conductive metal stock having screws threaded therein on one side thereof, and apertures in alignment with said screws on an orthogonal side thereof.

* * * * *